Patented Nov. 1, 1949

2,486,782

UNITED STATES PATENT OFFICE 2,486,782

VULCANIZED DEPOLYMERIZED RUBBER COMPOSITION AND METHOD OF MAKING

Kenneth V. Hardman, Montclair, N. J.

No Drawing. Application January 9, 1948,
Serial No. 1,485

5 Claims. (Cl. 260—775)

This invention relates to vulcanized depolymerized rubber and the method of making it.

Depolymerized rubber is now a standard article of commerce. It is made to advantage as described in Patent No. 2,349,549 issued to Herbert V. Hardman and Kenneth V. Hardman on May 23, 1944, by heating crude, vulcanized crude, or reclaimed rubber to a temperature causing melting and conversion of the rubber to a form that remains flowable after cooling to ordinary temperatures but that is vulcanizable with sulfur. Suitable conditions for depolymerization are maintenance of the rubber to be depolymerized at a temperature of approximately 270° to 300° C. and preferably about 290° C. for a period of several hours, suitably 2 to 4 hours.

Depolymerized rubber with admixed sulfur is useful for casting and curing, without the application of pressure during the curing operation. Because the depolymerized rubber is ordinarily of about the consistency of molasses at ordinary temperatures, there has been difficulty in preventing the development of pores or vesicles in the depolymerized rubber during curing. This difficulty has been particularly important when the depolymerized rubber is cast and cured in thick layers.

In the said patent to Hardman et al. there is described a method of removing gases which tend to form the bubbles in the mass during curing. The preferred method of this patent is kneading to remove gas under vacuum as completely as feasible followed by curing.

In endeavoring to find a more convenient means of preventing the development of objectionable porosity in the cured depolymerized rubber, I have incorporated unsuccessfully a large number of chemicals in an effort to prevent the development of bubbles of hydrogen sulfide and like gaseous by product of the curing of the depolymerized rubber with sulfur. I found that an oxidizing agent such as potassium permanganate was ineffective. Ineffective also were the common alkalies and acids. Likewise lead acetate was ineffective as were also commercial gas absorbing and drying agents of which silica gel, calcined plaster and activated carbon are examples.

I have discovered, however, two specific chemicals that are satisfactory in the preventing of development of objectionable porosity in curing depolymerized rubber. These chemicals are calcium oxide and phosphorus pentoxide.

With the use of either of these porosity inhibitors, there is obtained a cured depolymerized rubber product which is compact, that is, free from any large proportion of vesicles or pores. This condition I describe as being free from objectionable porosity although it is to be understood that there may be present a small proportion of very fine vesicles that are ordinarily invisible to the naked eye and, in most cases, are invisible even with moderate magnification.

The invention comprises the herein described compact depolymerized rubber composition made by vulcanizing depolymerized rubber with a usual type of sulfur cure and either calcium oxide or phosphorus pentoxide. The invention comprises also the method of manufacturing such compact cured product, including mixing depolymerized rubber with vulcanization materials of conventional kind and either calcium oxide or phosphorus pentoxide or a mixture of both and subjecting the resulting composition to an elevated temperature, to cause curing.

As the depolymerized rubber there is used a commercial product as, for instance, the depolymerized rubber made by heating crude or scrap rubber as described above. The sulfur which occurs in combined condition in the scrap rubber is not objectionable in my process.

As the vulcanizing agent free sulfur is used, that is, elemental sulfur. If the rubber that has been used initially in making the depolymerized stock has been previously cured with sulfur, the sulfur content of the depolymerized rubber is excluded in calculating the amount of free sulfur to be added.

Accelerators of vulcanization that are conventional in the rubber industry are used. Examples are mercaptobenzothiazole, tetramethylthiuram disulfide, diphenylguanidine, and diorthotolylguanidine (abbreviated to D. O. T. G.). These accelerators may be used alone but are used preferably in mixture with each other. Thus I use to advantage a mixture of the first two of the four given.

As the porosity inhibitor I have found no agents that are effective except calcium oxide and phosphorus pentoxide. Hydrated lime or calcium hydroxide is ineffective. The inhibitor is in finely divided, dry form.

In addition to the above, as active ingredients of my composition, I may and preferably do use various commercial fillers. Examples are clay, carbon black and blanc fixe. I may use also usual pigments and plasticizing agents as softeners for rubber compositions, although the latter are seldom if ever necessary.

As to proportions, the porosity inhibitor is used in the proportion of about 1 to 10 parts for 100 parts of rubber. Amounts in excess of 10 parts act mostly as filler.

Proportions here and elsewhere herein are expressed by weight unless otherwise specifically stated.

The sulfur, vulcanization accelerators and the fillers are used in proportions that are conventional in rubber compounding formulas. The sulfur, for example, may be used in widely varied proportion; for a composition to be polymerized to the soft state there is used to advantage 0.5 to 10 parts of sulfur for 100 parts of the depolymerized rubber, for semi-hard stocks 10 to 30 parts of the sulfur, and for hard or ebonite vulcanized product 20 to 50 parts of the sulfur. More sulfur than 50 parts may be used but excess sulfur serves as a filler; there are more economical fillers readily available.

Of the vulcanization accelerators I use about 0.5 to 5 parts or so for 100 parts of depolymerized rubber. In commercial operations the proportion used is usually 1 to 2 or 3 parts of the accelerators. I have used, for instance, 1 part of a mixture of equal parts of diorthotolylguanidine and mercaptobenzothiazole.

As to filler, the proportions to be used here depend very largely on the hardness desired in the finished stock. There may be used for example 5 to 180 parts of filler for 100 parts of the depolymerized rubber.

In general, the lower the proportion of accelerator used, the more the proportion of sulfur or filler or both required for a given hardness of the finished stock.

In making my depolymerized rubber compound, the sulfur, accelerator, and also the filler, if any, are incorporated in finely pulverized or powder form. As incorporated they are preferably dry.

The depolymerized rubber is preferably introduced first into a mixer and the solid components then incorporated, either singly or together. A light mixer is satisfactory, as, for instance, a usual dough mixer or power churn.

After the mixing is completed, the resulting mixture is shaped and cured.

For most uses, the product is cast into molds which need not be pressure molds. If, however, the material is to be used as a coating as on a fabric, then the shaping is a usual means for spreading a flowable mass upon the base fabric. The mixture is ordinarily shaped at an elevated temperature, as at about 150° to 180° F., so as to increase the flowability. No solvent is required.

After being shaped, the depolymerized rubber composition is raised to an elevated temperature known to cause curing of depolymerized rubber, sulfur, and accelerator mixtures. Thus the composition is heated to a temperature of at least about 240° F. and below the temperature of objectionable decomposition of the depolymerized rubber. 350° F. is about the maximum for safe operation. Below 240° F., on the other hand, the rate of curing is objectionably slow. Actually I obtain best commercial results at 250° F. to 300° F.

The time of cure will vary with the hardness desired in the finished stock, with the temperature selected for the cure, and somewhat also with proportion of sulfur and accelerators. Within the temperature ranges discussed above, I effect cures in times as low as 1 minute at the higher temperatures and for the more quickly reactive mixtures in a mass that is thin, so that the heat will penetrate quickly through the mass. Depending upon the other factors recited, the times of cure may be increased from this almost momentary period up to 24 hours or so, times towards the larger part of this range being used only with low temperatures such as 250° F. Usually conditions are so chosen that the cure is effected in 1 to 6 hours.

The invention will be further illustrated by description in connection with the following specific examples of the practice of it.

Example 1

Depolymerized rubber, made as described in the said Patent 2,349,549, is used. In this particular example, the depolymerized rubber is that resulting from heating crude rubber at about 290° C. for a period of approximately 3 hours.

The depolymerized rubber was then made into a compound by mixing with the several ingredients in the proportions by weight shown in the following table:

| | Parts |
|---|---|
| Depolymerized rubber | 100 |
| Calcium oxide | 5 |
| Sulfur | 4 |
| Mercaptothiazole | 2 |
| Tetramethylthiuram disulfide | 1 |
| Antimony sulfide | 3 |
| Clay filler | 60 |
| Zinc oxide (pigment) | 5 |
| Oleic acid (activator) | 5 |

The mixture is made uniform in a dough mixer. It is then ready for shaping and curing. The mixture may be applied as a coating to fabrics, metals, or plastics. It may be cast to shape in an open mold.

In either case, the composition after being shaped, is cured by heating at 290° F. for 1 to 3 minutes, to make stock that is not hard.

The product is compact and free or practically free of vesicles. A product made similarly but with the omission of the calcium oxide is characterized by large bubbles or vesicles caused by gas which develops and remains during the curing operation.

Example 2

A compound is made of the following formula:

| | Parts |
|---|---|
| Depolymerized reclaimed rubber | 100 |
| Calcium oxide | 10 |
| Sulfur | 45 |
| Diorthotolylguanidine | 1 |
| Clay | 70 |
| Zinc oxide | 4 |

The mixture is cured to a hard composition by being heated and maintained at 300° F. for three hours.

The calcium oxide is considered to function largely by neutralizing hydrogen sulfide and absorbing water formed as by products in the curing.

Example 3

The procedures of Examples 1 and 2, separately, are followed except that phosphorus pentoxide is substituted for calcium oxide on a pound for pound basis in the formulas of the Examples 1 and 2.

The cured materials made as described in Examples 1, 2, and 3 are compact and practically free of pores.

They are useful as cements, coatings, and cast shapes for various industrial uses.

In the use for cements, the objects to be cemented are brought together with an intervening layer of the depolymerized rubber composition in uncured condition and the assembly is then subjected to an elevated temperature, to cure the said composition.

It will be understood also that it is intended to cover all changes and modifications of the examples of the invention herein chosen for the purpose of illustration which do not constitute departures from the spirit and scope of the invention.

What I claim is:

1. A compact intimately compounded composition comprising depolymerized melted rubber, sulfur, a powdered filler, and a compound serving as a pore inhibitor and selected from the group consisting of calcium oxide and phosphorus pentoxide, proportions by weight being sulfur 10 to 50 parts, pore inhibiting compound 1 to 10 parts, and filler 5 to 70 parts for 100 parts of the depolymerized rubber.

2. In making a compact depolymerized rubber product, the method which comprises forming a mixture of depolymerized melted rubber, sulfur, a compound serving as a pore inhibitor and selected from the group consisting of calcium oxide and phosphorus pentoxide in the proportion of 1 to 10 parts by weight for 100 parts of the melted rubber, and an organic accelerator of rubber vulcanization, heating the mixture to rubber vulcanization temperature and maintaining the mixture at rubber vulcanization temperature until curing is effected.

3. In making a compact depolymerized rubber product, the method which comprises forming a mixture of depolymerized melted rubber, sulfur, phosphorus pentoxide serving as a pore inhibitor in the proportion of 1 to 10 parts by weight for 100 parts of the melted rubber, and an organic accelerator of rubber vulcanization, heating the mixture to rubber vulcanization temperature and maintaining the mixture at said temperature until curing is effected.

4. The method described in claim 2 including maintaining the said mixture at approximately atmospheric pressure at all times during the said heating to effect the curing.

5. The method described in claim 2, the said pore inhibitor being calcium oxide and the said rubber vulcanization temperature to which the mixture is heated being about 290° F.

KENNETH V. HARDMAN.

REFERENCES CITED

The following references are of record in the file of this patent:

UNITED STATES PATENTS

| Number | Name | Date |
| --- | --- | --- |
| 538,147 | Barus | Apr. 23, 1895 |
| 1,979,499 | Skipsey | Nov. 6, 1934 |
| 2,255,779 | Kent | Sept. 16, 1941 |
| 2,349,549 | Hardman | May 23, 1944 |

FOREIGN PATENTS

| Number | Country | Date |
| --- | --- | --- |
| 393,292 | Germany | Mar. 31, 1924 |
| 415,954 | Great Britain | Sept. 6, 1934 |